United States Patent
Lewandowski et al.

[19]

[11] Patent Number: 5,811,289
[45] Date of Patent: Sep. 22, 1998

[54] PROCESS AND APPARATUS FOR EFFECTING A BIOLOGICAL AEROBIC PRETREATMENT OF DAIRY INDUSTRY EFFLUENT

[76] Inventors: Raymond Lewandowski; Sylvette Lewandowski, both of 3100 Chemin Duplessis, Fleurimont, Québec, Canada, J1H 5H3

[21] Appl. No.: 597,259

[22] Filed: Feb. 6, 1996

[51] Int. Cl.⁶ ........................................ C12S 13/00
[52] U.S. Cl. ..................... 435/262; 435/245; 435/252.4; 435/286.5; 435/286.6; 435/289.1; 435/308.1; 435/818; 210/614; 426/41
[58] Field of Search .................. 435/42, 245, 252.4, 435/3, 260, 261, 262, 272, 286.1, 286.5, 286.6, 289.1, 308.1, 813, 818; 210/614; 426/41

[56] References Cited

U.S. PATENT DOCUMENTS

| | | | |
|---|---|---|---|
| 3,818,109 | 6/1974 | Bechtle | 426/41 |
| 3,840,670 | 10/1974 | Holt . | |
| 3,930,028 | 12/1975 | Ullman . | |
| 3,961,078 | 6/1976 | Stitt | 426/41 |
| 4,048,339 | 9/1977 | Koudrateuko . | |
| 4,066,792 | 1/1978 | Kauda . | |
| 4,202,909 | 5/1980 | Pederson . | |
| 4,211,798 | 7/1980 | Cater . | |
| 4,235,933 | 11/1980 | Moon . | |
| 4,318,928 | 3/1982 | Sing . | |
| 4,391,887 | 7/1983 | Baumgarten et al. | 435/245 |
| 4,399,160 | 8/1983 | Schwartz . | |
| 4,442,128 | 4/1984 | Schwartz . | |
| 4,444,793 | 4/1984 | Schwartz . | |
| 4,497,833 | 2/1985 | Anderson . | |
| 4,790,994 | 12/1988 | Matrozza . | |
| 4,818,408 | 4/1989 | Hamamoto | 210/614 |
| 4,844,923 | 7/1989 | Herrmann . | |
| 4,954,450 | 9/1990 | Brothersen et al. | 435/42 |

FOREIGN PATENT DOCUMENTS

| | | | |
|---|---|---|---|
| 0 274 856 | 7/1988 | European Pat. Off. | 435/245 |
| 2 626 568 | 8/1989 | France | 210/614 |
| 25 00 323 | 7/1976 | Germany . | |
| 1-242199 | 9/1989 | Japan | 210/614 |
| 4-018992 | 1/1992 | Japan | 210/614 |

OTHER PUBLICATIONS

Atkin et al."Continuous Propagation of Trichosporon cutaneum in Cheese Whey." Applied Microbiology, vol. 15 (1967), pp. 1339–1344.

*Primary Examiner*—William H. Beisner
*Attorney, Agent, or Firm*—François Martineau

[57] ABSTRACT

This aerobic waste pretreatment process comprises inoculating a milk industry effluent with a mixture of bacteria and yeasts both classes of microorganisms capable of living and growing in symbiosis in the effluent, the population of the bacteria being, in most cases, several times greater than the population of the yeasts, maintaining the temperature and pH of the inoculated effluent between 0° C. and 50° C. and between 1.7 and 9, aerating the effluent while varying, if necessary, the pH at maximum rate of 1.5 pH units per minute and also, if required, modulating the aeration of the inoculated effluent at a maximum rate of 130 micromoles of oxygen per minute. A biomass is obtained which has a good nutritional value suitable for animal feed.

19 Claims, 1 Drawing Sheet

5,811,289

PROCESS AND APPARATUS FOR EFFECTING A BIOLOGICAL AEROBIC PRETREATMENT OF DAIRY INDUSTRY EFFLUENT

FIELD OF THE INVENTION

This invention relates to a biological aerobic process and to an apparatus for the pretreatment of dairy industry effluents.

BACKGROUND OF THE INVENTION

The classical biological treatment of dairy industry effluent relies on their aeration which leads to the natural development of a flora whose pH at equilibrium is such as it would be if the effluent had been unloaded into a natural milieu, namely a nearly neutral pH. Previous neutralization of these usually alkaline dairy industry effluents is not essential because the carbonic acid released by the treating microorganisms neutralises the inflowing causticity in such a way that, under aeration, the liquid pH remains nearly neutral. The bicarbonates produced during the neutralization process impart to the liquor being treated a buffer power which increases with a higher inflowing causticity; the latter may then be admitted continuously in the liquor during treatment.

With regard to acidic effluents, there is much less leeway because the classical flora produces metabolites that also contribute further acidity. Under normal operation, a high but temporary inflowing acidity is not detrimental since it is neutralized by the bicarbonate buffer of the liquor being treated. Should the inflowing acidity be high and sustained, the classical flora will be affected, and so will the pretreatment yield if no prior neutralization of effluent is performed.

A dairy industry effluent having a pH lower than the pK of carbonic acid, namely which does not possess any bicarbonate buffer, can be continuously subjected to a classical biological treatment. However, the pH of such an effluent must not be too low to permit maintenance of a certain degree of the pretreatment yield. In this case, the flora makeup remains classical and tends to increase the liquor pH to the vicinity of 7.

The lower the effluent pH, the more the store of bicarbonates in the medium decreases thus compromising the activity of the microorganisms constituting the classical flora. Nitrobacteria in particular (Nitrosomonas and Nitrobacter) no longer find the alkaline conditions necessary for degradation of nitrogen-bearing compounds.

If the inflowing effluent remains too acidic, the conventional treatment station will soon become non-operating.

In conclusion, the natural pretreatment processes encountered in classical treatment stations are spontaneously confined to a narrow range of nearly neutral pH values.

The kinetics of degradation of the naturally occurring flora under extended aeration is limited: this is apparent since the load being subjected to aeration is of the order of 4mg of Chemical Oxygen Demand per gram of suspended solids and per hour (4 mgCOD/gSS/h). The classical biological treatment of effluent necessitates a bulky apparatus since it requires effluent contact time of up to several days.

The sludges produced by the classical treatment stations are difficult to dewater and, since they have no usefulness, they must be disposed of, more often by landfill, or, at best, by scattering on fields.

OBJECTS OF THE INVENTION

The main object is to provide a thorough pretreatment of dairy industry effluents by a biological aerobic process yielding results several hundred times faster than the classical biological processes and using much more compact apparatus.

A corollary object consists in the production of a biomass with enhanced nutritional value usable as animal feed which would be a source of revenue for the dairy industry.

Another object is to provide a process of the character described which yields energy, thereby constituting an additional source of revenue.

DETAILED DESCRIPTION OF A PREFERRED EMBODIMENT

Figure 1:
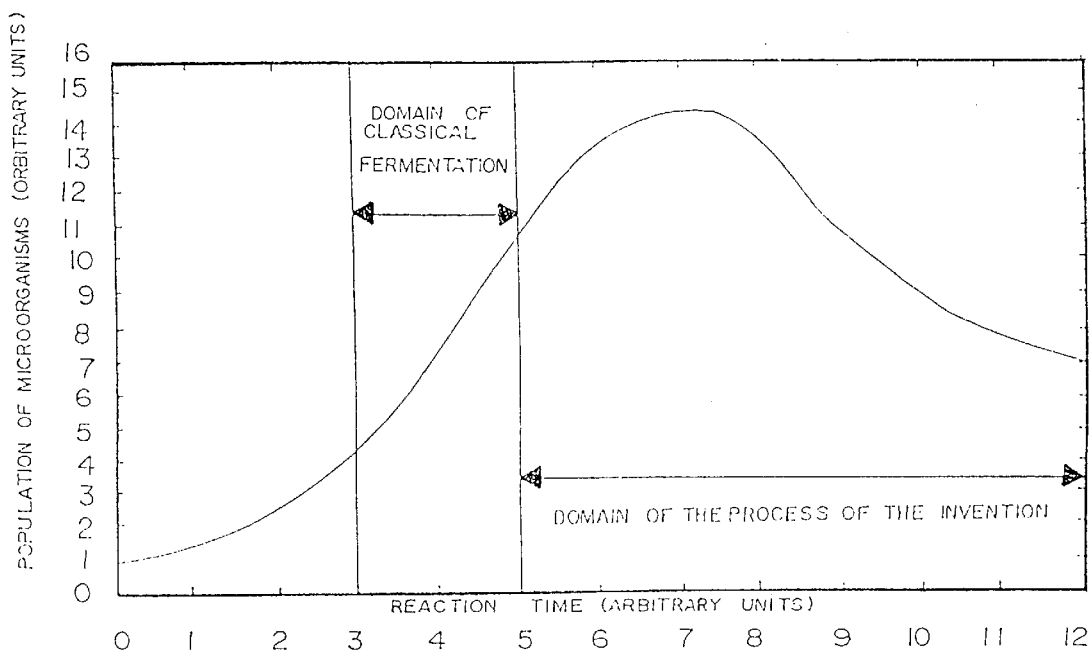
FIG. 1 is a comparison graph.

The pretreating action obtained by the process in accordance with the invention is selective and is essentially directed to the oses contained in the effluent as mainly represented by lactose. This sugar produces severe malfunction of the classical treatment stations even if those are correctly dimensioned; this sugar produces unwelcome development of filamentous bacteria resulting in sludge bulking and therefore of a poor and frequently nil sedimentation. The process in accordance with the invention is neither a classical treatment process nor a fermentation process as conventionally practised in the industry.

The present invention relies on the aerobic treatment of dairy industry effluent under induced conditions, different from those spontaneously generated by classical aerobic biological processes, permitting the development of a characteristic flora specific to the substrates present in dairy industry effluent.

One of the characteristics of the present invention is the production of a specific flora which is not confined to a narrow range of nearly neutral pH values of the liquor being treated but is active under a large pH range including acid pH values as low as 1.7. The specific flora, in accordance with the invention, consists of a mixture of bacteria and of yeasts brought to live in symbiosis. The bacteria populations are preferably 10, 100 and sometimes 1000 times those of the yeasts. This composition of the flora is totally different from those found in conventional treatment stations since these latter would be incapable of surviving at a pH range as low as the one in which live the strains in accordance with the invention. In particular, protozoa are absent from the strains of the invention. The composition of the strains and the conditions under which they are obtained enable the treatment of specific pollutant loads per mass unit which are several hundred times higher than those treated in conventional, biological stations. The Chemical Oxygen Demand (COD) pretreatment yield in accordance with the invention is, on the average, 80%–90% but can attain 97.5% under certain conditions thereby approaching the yield of a complete treatment, namely from 97% to 99%.

Another important difference between the process in accordance with the invention and the classical biological for waste treatment process reside in the fact that the latter degrades milk products which are elaborate substances having a high energy content whereas the process in accordance with the invention produces a biomass of a higher value than that of the milk products initially contained in the effluent being treated. This enhancement results from biosyntheses for which the energy is derived from the degradation of part of the lactose content in the effluent. A portion of this sugar is biologically burned and therefore disappears from the liquor. This exothermic reaction raises the temperature of the effluent load up to near 50° C. Such a temperature raise is possible due to the small volume of the reactor vessel in which the process is carried out.

Yeasts used in baking, wine making or for the production of nutritional yeasts are produced from substrates containing sugar such as molasses, their replacement by whey or its derivative having been attempted but without success. However, the objectives and the conditions of operation are extremely different from those of waste water treatment. In the fermentation industry, the main goal sought is the production of a biomass and not the removal of matter from a liquid. Moreover, the range of concentrations within which the fermentation industry works is completely different from the range in the treatment of liquid effluent concentrations. The concentration of sugar in the molasses used for the production of baking yeasts is about 250 grams per liter and the waste waters of the fermentation process may have a COD of tens of grams per liter. On the other hand, the normal liquid effluents of the dairy industry are in general much more diluted (COD of 2000–8000 milligrams per liter).

The use of yeasts for the treatment of dairy industry effluents begins where the industrial application ends. Consideration has been given, from a theoretical or general point of view (Current Development in Yeast Research, Meyrath, J. and Braun R. (1980). Proceedings of the Fifth International Yeast Symposium, London, Canada, July 20–25$^{th}$. Pages 25–31), to the use of yeast strains for the treatment of dairy industry effluent, but it has never been the object of any industrial application nor has it been commercialized. The activity and the behaviour of yeasts are very specific, and it is not possible to find common criteria which would guarantee effective industrial treatment of a variety of substrates because a nomenclature reclassifies them in the same chemical class (for example, carbohydrates) and it is impossible to find plant dimensioning specifications from biology manuals.

The present invention applies specifically to dairy industry effluents with the restriction that the dairy products unloaded by a given plant be contained in the waters used for the industrial process; the water used for washing tanks or machines which contained said dairy products, for instance. Dairy byproducts are within the field of application of the present invention in as much as they are part of the effluents. Dairy products per se are excluded as substrates used in this invention. Whey from the cheese industry is not included because, in spite of its liquid state, it contains no water other than that from the milk of which it is a constituent. On the other hand, waste water contaminated by whey coming from cleaning, pipe leaks or accidental spills are within the scope of the present invention provided this whey is present in the effluent to be treated.

The present invention therefore applies to the pretreatment of dairy industry effluents wherein the substrates are diluted and contain lactose, a basic bisaccaride, and in which bacteria contamination is present. Secondary ose compounds can be present such as those used in the manufacturing of ice cream.

The use of yeast strains, among others, for treatment of dairy industry effluent according to this invention is fundamentally different from that of industrial fermentation because the substrate, waste water, is not a purchased raw material, but a worthless, free product that must be disposed of. Contrarily to the industrial fermentation, it is not possible to have recourse to auxiliaries of fabrication such as corn steep liquor or to chemical anti-foaming agents because these products would add to the pollution of the effluent to be treated.

Another fundamental difference between the process of the present invention and that of industrial fermentation is the rigorously controlled asepsis of the latter, which would not be realistic for the treatment of waste waters for economic or ecological reasons or both.

The asepsis results from the application of heat or from the use of chemicals such as hydrogen peroxide, chlorine, or of antibiotics. It is progressively forbidden to use chlorine for disinfecting treated waste waters and more so for disinfection raw waste waters because this halogen produces organic compounds which are toxic and stables. Very high concentrations of halogens would be required for disinfecting raw waste waters and this would be costly. Use of hydrogen peroxide would create the formation of toxic quinone compounds in the presence of organic matters. The treatment cost would still be higher than with chlorine because the microorganisms to be eliminated react by catalase emission which destroys the peroxide, increasing consumption of this product. Certain searchers have proposed the use of membranes for water and air filtration in order to prevent all contamination and thus to enable the use of certain selected microorganisms. However, this way of working is prevented by very serious problems of filter clogging and the cost would be much too high.

One of the essential characteristics of the present invention is precisely the coordinated activity of yeasts and bacteria whose presence in the treatment medium is artificially induced contrarily to the naturally occurring flora growth of conventional treatment processes.

Another difference relative to industrial fermentation is the age of the yeast populations. FIG. 1 illustrates the comparison of the utilisation of yeasts in the process of the present invention, on one hand, and in industrial fermentation, on the other hand. This figure shows the growth stages of a yeast population in a closed environment. To the exponential growth rate phase, domain of the industrial fermentations, succeeds a maximum followed by a progressively decreasing growth phase, domain of application most frequently used for the yeasts according to the present invention. Operation during the exponential growth phase is nonetheless possible, but it is advantageous only when effecting partial pretreating of concentrated effluents which is now rare.

Another difference between the present invention and industrial fermentation processes resides in that the latter are generally batch processes because aseptic conditions are more easily controlled whereas the process in accordance with the present invention is preferably a continuous process since aseptic conditions are not required. Obviously, a batch process could be used in accordance with the invention.

Since the process according to the present invention is preferably implemented on a continuous basis, yeasts of all ages (from birth to autolysis) are present in a given population at equilibrium, contrary to the much more uniform age of the yeast population in a conventional batch fermentation process. The physical properties of the yeasts in the present invention are quite different from those of the yeasts produced during the exponential growth phase in particularly in their absorption capacity and their aptitude for sedimentation.

Because of the difficulty of permanently maintaining asepsis in large liquor volumes and the resulting drift, industrial fermentations are conducted in batches with pure strains renewed at each batch. Most of the yeasts produced by fermentation throughout the world are issued from single strains. Fermentations using several associated types of microorganisms, either of the same type or of different types are rarer. Industrial fermentation processes are based on essentially unstable population of microorganisms.

The present invention is based on the synergy of the strains brought to live in symbiosis and which resist against the usual contaminations found in waste liquids. They form a stable microorganism population, in fact, once the population has been adjusted to the specificity of the effluent to be treated, no drift has been observed after five years of operation.

The profile of the strains to be inoculated at the outset of the treatment must be adapted to each specific case. For this purpose, pure strains (specifically named hereinafter) are selected and cultivated on the effluents to be treated.

According to the present invention, the inoculum may be prepared in two ways.

According to the first method, nutrients are added to a sample of the effluent to be treated; its pH is varied within a range comprised between 1.7 and 9; this variation is induced and depends on the type of effluent. The sample thus prepared is inoculated with a part of the strains in the desired proportions. Then, the sample is aerated in a pulsating manner, at a rate going from microaeration to a maximum of 15 grams of injected oxygen per hour and per gram of COD of the sample. Culture is effected at the effluent temperature at a maximum temperature of 50° C.

With time, turbidity appears, and it is increased by feeding the sample, always aerated, with effluent while modulating the physical and chemical parameters in order to obtain an optimal development by successive approaches. It is also in an empirical manner that one determines the profile and the quantity of microorganisms to be added to the effluent to be treated by measuring, for instance, the kinetics of disappearance of the oses compounds to be eliminated.

When the sample turbidity has become sufficiently important, the flora is separated by centrifugation, one part is collected and inoculated with another part of the microorganisms and the new sample is subjected to pH and aeration modulations as above. These operations are repeated during a period of up to two years after which the inoculum obtained is suited for the particular type of effluent to be pretreated. Progressive acclimatization with successive generations induces natural genetic selections (no strain is genetically manipulated within the scope of the present invention). It is essential to feed the strains to the specific effluent load per mass unit to be eventually pretreated because the profile of the culture or inoculum at equilibrium greatly depends on this load. Once the inoculum is obtained, it is possible to render it dormant but the optimal stability of its composition is insured by permanent maintenance of its culture.

The second and simpler method of preparation of the inoculum is longer (up to three years) and less precise than the first method. It consists in preparing the inoculum under psychrophilic and microaerophilic conditions. A sample of the specific effluent to be treated is left idle at a temperature between 0° C. and 4° C., its pH is adjusted and nutrients are added, the sample is placed in a container having walls consisting of membranes which are permeable to the oxygen in the air. Every month, the generated biomass is separated, the base strains are adjusted, the residual lactose is measured, the composition of the strains is consequently adjusted and fresh effluent is added to the mixture. The gaseous medium surrounding the membranes can be atmospheric air, air enriched with oxygen or pure oxygen. The inoculum prepared under cold conditions generally require a final adjustment before being used for inoculating the reactor vessel.

Preparation of the strains in accordance with one or the other of the two methods just described can be carried out as a continuous process but this would be a more complex operation.

Lyophilization of the inoculum results in unequal surviving rates of the microorganisms in spite of the use of cryoprotectors. Once revived, the lyophilized inoculum is out of equilibrium and must be readjusted before use.

In order to be able to treat without delay all types of effluents which might exist in the dairy industry, it is advisable to maintain a series of different strain mixtures to be individually adjusted at the time of use.

The small volume of the mixture of microorganisms, once obtained by either one of the above noted methods, is then used to inoculate the industrial bioreactor which can then be brought to equilibrium within a few hours.

The bacteria used in the composition of the culture according to the present invention are selected from the following species: *acetobacters, bifidobacteria, lactobacillus, leuconostocs, pseudomonas, propionibacterium* and *lactic streptococci*.

Yeast species used in the composition of the culture according to the present invention are selected from the following group: Candida, Debaryomyces, Dekkera, Lipomyces, Pichia, Rhodotorula, Trichosporon, Saccharomyces.

The Kluyveromyces species generally used for assimilating lactose does not live in the effluent to be treated in accordance with the invention. It is too sensible to the contaminations present in waste waters and to the presence of the other species. It dies down without succeeding in implanting itself.

It is important to know that lactose treatment is not carried out into two separate steps: first, by treating with bacteria, and second by separate treatment by yeasts. All these species act simultaneously in a single step as soon as the treatment reactor has been inoculated.

When the temperature of the liquor in the reactor vessel is comprised between 20° C. and 50° C., the bacteria species will preferably comprise one, several or the totality of the following bacteria strains:

Lactobacillus acidophilus, Lactobacillus delbruecki bulgaricus, Lactobacillus delbruecki delbruecki, Lactobacillus delbruecki lactis, Lactobacillus farciminis, Lactobacillus fermentum, Lactobacillus helveticus and Streptococcus thermophilus, the yeasts being selected as above.

When the temperature of the liquor is less than 20° C., the bacteria species will preferably comprise one more or the totality of the following bacteria strains:

Lactobacillus brevis, Lactobacillus casei casei, Lactobacillus kefir, Lactobacillus plantarum, Leuconostoc dextranicum, Leuconostoc lactis, Leuconostoc mesenteroides cremoris, Leuconostoc mesenteroides mesentoroides, Streptococcus lactis cremoris and Streptococcus lactis lactis, the yeasts being selected as above.

If the liquor is submitted during treatment to anaerobic conditions, for example when a portion circulates through piping of the treating apparatus, the culture, according to the present invention, could include, in addition to the preceding bacteria strains, one, several or all of the following: *Bifidobacterium bifidum, Bifidobacterium breve* and *Bifidobacterium infantis.*

It is important to note that, in spite of the fact that the liquor within the reactor is subjected to powerful stirring, it remains anisotropic as far as dissolved oxygen and particles sedimentability are concerned. Due to the high concentration of the biomass, there exists dissolved oxygen gradients and one can also observe zones of flocculation and of sedimentation within defined areas of high turbulence zones.

When the biomass produced according to the present invention is intended for animal feed, the appetency can be increased by developing aroma by the adjunction to the base strains of one, several or all of the following strains: *Acetobacter aceti, Propionibacterium freundenreichii shermanii, Pseudomonas fragi,* and *Streptococcus lactis diacetylactis.* Those species develop very moderately in effluent, either because of competition or because their growth is naturally slow, as is the case for example for *Propionibacterium freudenreichii shermanii,* or because the conditions of pH or aeration are not optimal for their growth.

The yeasts used in the composition of the culture according to the present invention are selected from one or more of the following strains: *Candida aaseri, Candida auringiensis, Candida bertae, Candida blankii, Candida coipomensis, Candida curvata, Candida entomaea, Candida entomophila, Candida edax, Candida famata, Candida fennica, Candida fluviatilis, Candida halophila, Candida hellenica, Candida intermedia, Candida mannitofaciens, Candida paludigena, Candida pseudotropicalis, Candida saitoana, Candida sake, Candida salmanticensis, Candida sheatae, Candida valdiviana, Candida versatilis, Debaryomyces castellii, Debaryomyces marama, Debaryomyces occidental is, Debaryomyces polymorphus, Debaryomyces pseudopolymorphus, Debaryomyces tamarii, Debaryomyces yamadae, Dekkera anomala, Lipomyces starkeyi, Lipomyces tetrasporus, Pichia abadieae, Pichia acaciae, Pichia farinosa, Pichia membranefaciens, Pichia mexicana, Pichia scolyti, Pichia sorbitophila, Pichia stipitis, Rhodotorula acuta, Rhodotorula dulciaminis, Rhodotorula minuta, Trichosporon aquatile, Trichosporon beigelii, Trichosporon loubieri.*

When the effluent contain saccharose, as for example those from ice cream factories, *Saccharomyces cerevisiae* may be added to the basic yeast strains. Saccharomyces consume saccharose but are inactive against lactose. The activity against saccharose of the basic yeasts according to the present invention is quite low; the kinetics of disappearance of saccharose being about 400 to 500 times slower in their presence than in the presence of *Saccharomyces cerevisiae.* Therefore, there is no real competition between among these species and they can coexist.

This coexistence is due to the presence of the large population of the bacteria in the flora and also to the physical and chemical conditions which are imposed to the liquor being treated. The bacterial lyses which occur during degradation of the pollutants, produce new substrates which are simpler and which can then constitute additional nutrients for the yeasts which, otherwise, the latter would not have had, and this degradation, more importantly, diversifies the substrates. Because of the diversity of the types of nutrients and due to the nutritional specificity of the yeasts, the competitions are not excessive and the yeasts coexist inasmuch as they have been properly selected for the specific effluent to be treated. This lack of competition generates a synergistic effect. For example, the kinetics of lactose degradation in the effluent from a cheese factory is more rapid if one simultaneously adds to the effluent Saccharose and *Saccharomyces cerevisiae.* At equilibrium, the liquor contained in the bioreactor vessel, in accordance with the invention, contains from to $10^2$ to $10^{13}$ total bacteria per gram of suspended matter, expressed in dry weight and from $10^2$ to $10^{11}$ total yeats per gram of matter expressed in dry weight.

The strains thus cultured and developed in the dairy medium suited to produce the inoculum possess, depending on their composition, often strong and varied aromas of: fruit (apple most often), seaweed, bakery, etc.

Since, for a given effluent, the composition of the inoculum depends on the applied specific load, the same is true for the associated aromas. The fruit aromas of the ethers which are frequently present in high or medium specific load per mass unit, are practically absent at small specific load per mass unit where pyrazines are predominant, the latter having a characteristic odour. The perception of the odours of the apparatus is a way of qualitatively controlling its operation.

According to the invention, the microorganisms are used in aerobic conditions, but they have the ability of staying alive in a milieu completely deprived of air even for a long period. The yeast strains continue to live and reproduce in the latter case. Certain strains are active only in the presence of air, but when completely deprived of air, they only fall in a latent state and are reactivated when aerated again. This constitutes another difference with the classical treatment processes in which the microorganisms which are used are unable to withstand anaerobiosis which kills them quickly. In classical processes, extended anoxia rapidly decreases the treating capacity of the classical flora, and putrefaction takes place accompanied by nauseous odours. Therefore, it is crucial, in classical processes, to remove the sludges subjected to anoxia from the solid-liquid phase separator and to return them without too much delay to aeration.

According to the present invention, the biomass can be removed from aeration without needing rapid return to such conditions. It can be kept for a extended period in non-aerated reservoirs as a spare biomass to be used should that of the treatment system be lost.

Nutrients may be required for effective treatment, especially for treatment of cheese making effluents. The nitrogen necessary for their classical treatment is about BOD5/N=100/5 (Biochemical Oxygen Demand for five days/nitrogen). In the process in accordance with the invention, the demand is reduced to BOD5/N=100/1.2 to 2.6. This economy is due to the enzymatic actions of the microorganisms which lyse the milk proteins into aminoacids, therefore liberating nitrogen into the milieu itself thereby eliminating addition of external nitrogen. This proteasic action is due mainly to the bacteria, the yeast being much slower in this connection.

However, when required, nitrogen can be adjusted by adding ammonium salts, ammonium hydroxide, urea, amines, amides or amino-acids.

The addition of phosphorus is generally not necessary, particularly when phosphoric acid is used by dairies for washing.

In this case, the pre-treatment by the present invention is accompanied by automatic phosphorus removal of the effluents.

When required, addition of phosphorous, similarly to nitrogen, is one half to one quarter of the addition required in classical processes.

According to the present invention, it is possible to dispense totally with addition of nitrogen and/or phosphorous by hydrolysing part of either the waste water to be treated or of the biomass being recycled (if this is the case) or of both. This hydrolysis can be achieved by acidic or enzymatic reactions. The result in either cases being the liberation of aminoacids which are assimilable by the flora. These aminoacids can be furnished either by a fraction of the waste waters to be treated or by a fraction of the recycled biomass when this is the case. Each day, one continuously adds to the fraction of the liquid to be hydrolysed, all of the acid daily required by the effluent to attain the required pH in the reactor vessel. The acid which is thus concentrated on a fraction of the liquid insures hydrolysis within one to twelve hours.

Globally, acid consumption is exactly the same as if hydrolysis would not have taken place. Exterior addition of nutrients is thus reduced and can be zero.

Enzymatic hydrolysis must be reserved to particular cases. It is implemented in the same way as acid hydrolysis except for the use of enzymes in replacement of acids. Seric proteins (Proteoses and Peptones) are slightly affected by the proteolytic activity of the flora. As they are not absorbed by the flora, they are left in the pretreated water which leads to a limit yield of pretreatment for each type of waste water. The maximal absolute yield obtained by the process in accordance with the invention, is 92% with a high load, 94% for a medium load and 97.5% for a low load.

The strains in accordance with the invention are allowed to grow as a free culture since they do not form on a support, for example, on the trickling filters used in classical treating processes. The flora, even if it is maintained under maximal self floccutating conditions, is by its nature poorly adherent and inhibits the adherence which is possessed by the remaining part of the biomass. Forceful fixation of the strains on a support (with the help of a gel as an example) only produces temporary results. This fixation is conducive to concentration of the bacteria present in the waste into zones where they are no longer subjected to the attack by the inoculated microorganisms. The result is putrescent fermentations with desegregation of the support.

According to the process of the invention, the effluents to be treated are introduced in a reactor vessel which is equipped with an aerating system which injects air and/or oxygen and which may be a surface aerator, an insufflation system or a streaming down system. The specific power of this system should be comprised between 500 and 2500 Watt/m$^3$ of reactor vessel useful volume. Such a stirring power is the result of the compactness of the system, wherein the concentration in the suspended solids (S.S.) is generally of the order of 30 grams per liter. These characteristics constitute another difference compared to the classical pretreating processes where the stirring power is only of the order of 5 to 50 W/m$^3$ and the S.S. concentration only of 4 to 6 grams per liter. The specific oxygen demand of the active biomass of the bioreactor is only 30% to 70% of that required by classical processes.

Certain effluents have foaming characteristics. It has been found in accordance with the invention that the foaming activity decreases with increase of the average age of the pretreating microorganisms; consequently foaming can be prevented. This is another difference with respect to industrial fermentation processes, wherein foaming is a permanent problem since the sludges are young.

If it is desired to treat a higher load of an effluent with foaming properties, it is necessary to use in the bioreactor a mechanical defoaming device.

In the same manner it is possible to control the physical and chemical parameters in such a way as to obtain a flora which will flocculate when unloaded from the reactor even after stirring for a few hours under a stirring power of 2500 W/m$^3$: this helps with the ulterior separation of the phases. During stirring, the floc is broken down and its highly dispersed state favours intimate contact with the substrate to be assimilated. This is again a difference with the classical pretreating processes, wherein the small stirring power results in large-scale flocculation and this decreases the specific contact surface, one of the reasons why classical processes are so extensive.

In industrial fermentation, all the means available are used to completely prevent flocculation and constitutes another difference with the present invention. The age of the biomass, in accordance with the invention, increases this aggregating capacity. This property is contrary to that of the sludges in classical processes which deflocculate with age increase. The age of the biomass in accordance with the invention, is only from 4 to 16 hours comparing to 3 to 4 weeks with the classical processes using extended aeration. The flora in accordance with the invention has marked adsorption properties and when it precipitates, it pulls down the substances which it has not biodegraded.

It has been found according to the invention that the induced cyclic increases and decreases of the pH in the reactor vessel favour equilibrium maintenance of the species present and also flocculation of the biomass which it contains. The optimal variation of the pH to be applied to the system depends on the effluent characteristics at the moment it enters the bioreactor vessel, including those it acquires when transitting through a buffer vessel. The value of this pH variation can be high and attain 1.5 units per minute as permitted by the very high stirring power, the pH staying between 1.7 and 9. Certain effluents have a pH range which can cause certain yeast cells to form pseudomycelia or mycelia which leads to a filamentous network carrying down the few remaining free yeast cells; the biomass is therefore very easily separated from the interstitial water. A similar result can be achieved at a higher pH by applying a very low specific load per mass unit to the reactor.

During the pH upswing, the flora profile tends to be modified in favour of the bacteria but certain functions of the yeasts are also simulated such as the production of β-galactosidase which leads to a faster assimilation of lactose. During the pH downswing, the flora profile tends to be modified in favour of the yeasts since the activity of the bacteria is temporarily slowed down; bacteria do not suffer from very low pH conditions provided they do not remain too long in such a milieu. The pH pulsations must satisfy as much as possible the coexistence of the two classes of species and this is determined by a numerical taxonomy obtained by auxanograms and zymograms. Periodic scanning of the pH range successively revivify the microorganisms whereas permanent maintenance of a uniform pH would be optimal for only a few species, the remaining species being forced to a reduced activity or to a pseudolatent state or even to their complete disappearance.

It has also been found, in accordance with the invention that the induced cyclic increases and decreases of the dissolved oxygen concentration in the reactive milieu also favour the coexistence of the species and moreover favour flocculation of the biomass. The frequency of the oxygen pulsations is determined in accordance with the obtention of the best coexistence of the species. The oxygen variation can attain a maximum of 130 micromoles of dissolved oxygen per liter of the reactive milieu and per minute (130 $\mu MO_2$/l/mn). This variation is made possible during the downswing of the oxygenation cycle because of the high microorganism concentration within the reactor vessel. Oxygen concentration variations as well as those of the pH can be symmetrical or not with respect to their maximum and cyclic or not.

The pollutants load applicable to the reactor is between 0 and 1500 mg of raw effluent COD per hour and per gram of S.S. in the reactor for a range of operating temperatures comprised between 0° and 42° C.; the yield of the pretreatment increasing with decreasing pollutants loads. It was found that the applicable load varies with the temperature, according to the following equation:

$$C = \frac{5 \cdot 10^{15}}{\mu} e^{\left(\lambda - \frac{8600}{T}\right)}$$

wherein:
C is the load in milligrams of COD per gram of total S.S. and per hour; T is the temperature in Kelvin degrees comprised between 273° K. and 315° K.; $\mu$ is the concentration of total S.S. in grams per liter; e=2.718 . . . and $\lambda$ is a coefficient comprised between 4.6 and 3.

For a specific load per mass unit of 0 to 800 mg COD/SS/h, the pretreatment yield is near the limit yield for an effluent under consideration. The decrease beyond this value depends on the types of effluent to be pretreated.

Comparison of such a load with the loads of classical processes using extended aeration (4 milligram COD/gram S.S./hour) should be done with caution since the extensive character of the classical process depends on the one hand on a higher pretreatment yield (from 98% to 99%) and on the other hand on the efforts to stabilize the sludges down to a low oxygen demand once they are unloaded from the pretreatment system.

The compactness of the process according to the invention depends on 1) the kinetics of lactose assimilation which is much higher for the flora of the invention than for microorganisms of the classical activated sludges, 2) the ability of this flora to reach high concentrations, and 3) to the easy maintenance of the effluent at a high temperature precisely because of the small volume of reactive milieu.

The quantity of S S generated by the treatment in the reactor varies from 20% of the eliminated COD, for effluents containing predominantly lactose, to about 40% for effluents containing ordinary milk. The rate of production of the biomass decreases with increasing average age of the flora.

In conventional industrial fermentation processes, the weight of yeasts which are produced is equal to about 50% of the weight of the input sugar. This ratio is often less in the present invention because the degree of flocculability desired for the biomass is attained by increasing its age and therefore its reduction by biological oxydation.

The detention time of the effluent in the reactor varies, depending on its specific load per mass unit, from a few dozens of minutes to a few hours.

When it comes out of the reactor, the liquor is submitted to liquid-solid phase separation by the method best suited to each case: decantation, centrifugation, filtration, etc. Thus the recovered biomass is either totally unloaded or partly recycled in the reactor in the case where a low input load operation is preferable. The excess biomass taken out of this pretreatment process is stored for further use in trophic chains, namely animal feed for bovids, crustaceans and the like.

Centrifugation is often the method of choice because it has the advantage of producing a concentrated biomass and simultaneously clarifying the waste water, enabling the use of a closed and compact system.

The colour of the sludges varies depending on the type of effluent and on the operating conditions chosen for the reactor.

It can be, for example, salmon pink, brick red or olive green; most frequently, it is ivory with a slight olive green tint.

The general formula of the biomass varies with the type of milk substrate within the following intervals:

$C_1 H_{1,62 \grave{a} 2,01} O_{0,23 \grave{a} 0,56} N_{0,12 \grave{a} 0,26} P_{0,01 \grave{a} 0,02} S_{0,04 \grave{a} 0,06}$.

The biomass resulting from an applied high specific load per mass unit, may be kept in a closed vessel without any particular precautions from a few weeks at room temperature to at least five years at a temperature of 4° C. and this in accordance with the nature of the effluent which has produced the biomass. This stability of the biomass, which has a high nutritional value, constitutes a fundamental difference with the classical processes wherein the sludges which are produced from high loads are highly putrescent. Sludges from classical processes remain stable provided they are the result of an aerobic digestion effected to consume the cell stocks.

The fruit aroma of the biomass in accordance with the invention increases with the years of storage.

The gross thermal energy produced by the process in accordance with invention is 1 to 4 kwh/kilogram of COD to be processed with a pretreating yield comprised between 80% and 90%. This energy can be recuperated by a simple heat exchanger and used for preheating the water of the plant boilers, to produce hot water to heat the plant and the offices and/or for preheating the air feeding the plant dryers.

Figure 2:
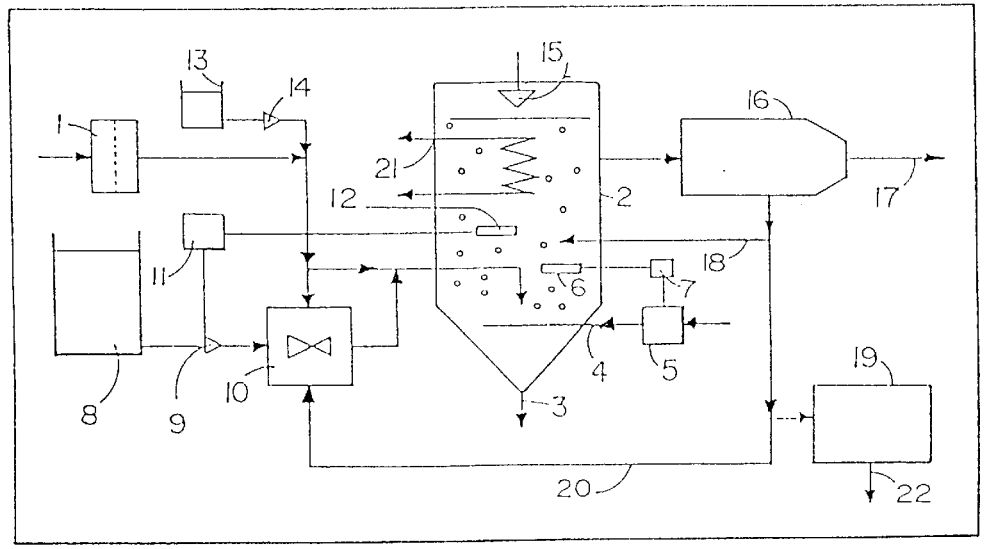
FIG. 2 is a flow diagram of the apparatus used for carrying out the process of the invention.

FIG. 2 represents a schematic view of the apparatus designed to achieve the above described process.

DETAILED DESCRIPTION OF THE APPARATUS

The raw effluent is fed to in a screening or filtration system 1 in order to eliminate large particles such as papers, rags, etc. It is then introduced in a reactor vessel 2 whose bottom, conical shaped for instance, is designed to allow sand settling, if present in the raw effluent. The sand can be periodically eliminated by means of a purge-gate 3. Vessel 2 is equipped with a mechanical anti-foaming device 15.

The reactor 2 is equipped with an aeration system 4, represented here by a variable speed air blower 5 which is modulated by a control system including an oxygen probe 6 connected to an oxygen meter 7 in turn connected to a programmer which controls blower 5 so as to vary the dissolved oxygen concentration in reactor 2.

The acid, stocked in a reservoir 8, is injected into reactor 2 by means of a variable pump 9 and a hydrolysing apparatus 10. The pump 9 is controlled by a pH regulatory system comprising a pH probe 12 connected to a pH meter 11 in turn connected to a programmer enabling the programmation of the variations of pH.

The nitrogen in the form of a nitrogen compound such as ammonia or an ammonium salt is prepared as a solution within a vessel 13 and is injected by a dosage pump 14 into the hydrolysing apparatus 10 (or optionally directly into the reactor vessel 2). The liquor unloaded from the reactor vessel 2 is introduced into a phase separator 16 which is shown as a centrifugal apparatus but which could be any other type of phase separator. The pretreated water is unloaded by piping 17 whereas the separated biomass is partially recycled into the reactor vessel 2 by piping 18 and partially into the hydrolysing apparatus 10 by an optional piping 20. The excess biomass is stored in a storage reservoir 19 before being discharged as animal feed by a conduit 22. A heat exchanger coil 21 within vessel 2 serves to extract heat energy from vessel 2 to be used elsewhere or to cool the liquor.

Reservoir 19 is never completely empty such as to constitute a reserve of biomass which is always renewed and which can be instantaneously used for reinoculating the bioreactor in case of a loss of the biomass within the same for example following massive discharge to the sewer of acid or caustic soda used for washings in the plant.

In order to simplify the flow diagram of FIG. 2, the hydrolysing apparatus 10 is represented as a unit separate from the bioreactor vessel 2 but in practice the two units are joined in order to heat apparatus 10 and thus accelerate the hydrolysis.

The following non-limitative examples present two applications of the above described process:

EXAMPLE 1

The case of a cheese factory effluent exclusively consisting of washing waters and having the following characteristics:

pH=10.3 COD=3500 mg/l temperature=25° C.

This effluent is fed at a rate of 4 m$^3$/h. A reactor vessel of 3.3 m$^3$ capacity, this vessel having first been in operation by an inoculum produced by the second method previously described. The flora is composed of the following strains expressed in million units per milliliter of liquor being treated:

bacteria strains: *Acetobacters aceti* 6, *Bifidobacterium bifidum* 12, *Bifidobacterium breve* 7, *Lactobacillus acidophilus* 242, *Lactobacillus delbruecki bulgaricus* 106, *Lactobacillus delbruecki lactis* 37, *Lactobacillus kefir* 47, *Leuconostoc lactis* 8, *Leuconostoc mesenteroides mesenteroides* 17, *Pseudomonas fragi* 29, *Streptococcus lactis diacetylactis* 27, *Streptococcus lactis lactis* 98, *Streptococcus thernmophilus* 42;

yeast strains: *Debaryomyces marama* 8, *Debaryomyces occidentalis* 12, *Debaryomyces polymorphus* 7, *Debaryomyces pseudopolymorphus* 5, *Debaryomyces yamadae* 11, *Lipomyces tetrasporus* 9, *Pichia membranefaciens* 278, *Pichia scolyti* 22, *Pichia sorbitophila* 107, *Pichia stipitis* 37.

The specific aerating power is 1850 (Watt/m$^3$), the pH of the liquor within the reactor is increased up to a value of 6 during a 15 minute upswing part of the cycle. During the downswing part of the cycle (10 minutes), the pH variation is $\Delta=144t$, where t is the time expressed in decimal hours from the start of the half cycle and $\Delta=-0.4H^{-1}$ during the second part of the cycle. The dissolved oxygen concentration is modulated between 0.1 and 1.0 milligram per liter with a rate of variation of 3 micromoles of oxygen per liter per minute (3 $\mu MO_2/l/mn$) in accordance with a symmetrical cycle. The liquor unloaded from the reactor is partly directed to a centrifuge and partly to a microfilter, the separated biomass is partly recycled within the bioreactor where it is maintained at a S.S. concentration of 9.5 grams per liter.

The applied load is 450 mgCOD/gS.S./h and the detention time is 50 minutes. The average age of the active population of the biomass within the bioreactor is 6¼ hours. The COD of the pretreated liquor is 230 milligrams per liter and the yield is 87.9%. When the detention time of the effluents within the bioreactor is increased to 9 hours, the pretreating yield attains 97.5%.

EXAMPLE 2

The case of the effluents from a cheese making plant where the whey is subjected to ultrafiltration and part of the permeated liquid is unloaded to the sewer, the resulting effluents presenting the following characteristics:

pH=9.8 COD=25200 mg/l lactose=18600 mg/l temperature=26° C.

This waste water is fed at a flow rate of 1.5 m$^3$ to a bioreactor vessel of 6 m$^3$ capacity and which has been operative by inoculation in accordance with the first method previously described. It should be noted that the volume of the reservoir to be used in accordance with the classical process using extended aeration would have been 1800 m$^3$, that is 300 times the volume in accordance with this example and that an anaerobic process would have required a reservoir volume of 500 ml to 80 m$^3$, namely from 30 to 83 times that of the vessel reservoir of this example.

The flora is composed of the following strains expressed in million units per milliliter of liquor being pretreated:

bacteria strains: *Lactobacillus acidophilus* 3500, *Lactobacillus brevis* 770, *Lactobacillus casei casei* 1250, *Lactobacillus delbruecki bulgaricus* 280, *Lactobacillus delbruecki lactis* 540, *Lactobacillus farciminis* 540, *Lactobacillus kefir* 1730, *Lactobacillus delbruecki delbruecki* 1810, *Leuconostoc lactis* 130, *Leuconostoc mesenteroides cremoris* 430, *Leuconostoc mesenteroides mesenteroides* 102, *Pseudomonas fragi* 940, *Streptococcus thermophilus* 1060, *Streptococcus lactis cremoris* 218;

yeast strains: *Candida curvata* 61, *Candida intermedia* 47, *Candida mannitofaciens* 35, *Candida pseudotropicalis* 278, *Candida sake* 84, *Candida shcatae* 310, *Pichia abadieae* 16, *Pichia acaciae* 12, *Pichia membranefaciens* 330, *Pichia mexicana* 60, *Pichia scolyti* 27.

The pH in the reactor is modulated in a 50 minute cycle up to 7.1 in accordance with a variation per cycle of $\Delta=10.94t-9.12$ where t is the time expressed in decimal hours from the start of the cycle. The bioreactor vessel is refrigerated by heat exchange with water at a temperature of 9° C. circulating at a rate of 0.8 m$^3$/h to thus maintain at 40° C. the temperature within the bioreactor. The heat of the effluent thus pretreated favours the biological finition downstream from the reactor especially in winter time. The net calorific power produced by the system is 28 kW, namely about 3 times the power (11 kW) used to operate this system. If the pretreated water is unloaded into a public sewer system where the temperature is limited for example to 30° C., then the net power produced by the system will amount to 40 kW. The liquor by the bioreactor vessel is admitted into a centrifuge which accelerates the particles to a value 5500 times that of the earth's gravity. The applied load is 625 mg COD/g SS/h and the detention time within the bioreactor vessel is 4 hours. The dissolved oxygen is modulated between 0.2 and 1.8 milligrams per liter with a variation of 5 micromoles of oxygen per liter per minute. The specific stirring power is 1630 W/m$^3$.

The COD of the pretreated water is 1950 milligram per liter and the COD pretreatment yield is 92%. The concentration of the lactose remaining in the treated water is under the minimum analytical detection level. The biomass has an apple aroma and is produced at a concentration of 15% S.S. and can be pumped. Its protein content is 51%, its vitamin content is considerably higher than that of the starting milk products. Pigs appreciate this biomass when used as animal feed.

I claim:

1. An aerobic process for pre-treating a milk industry effluent comprising the following steps:

a) acclimatizing an inoculum including a mixure of bacteria and yeasts both capable of living and growing in symbiosis in said effluent by repeatedly inoculating a sample of said effluent with said mixture and progressively adjusting the composition of the inoculum so as to progressively increase the elimination of lactose in the sample until complete lactose elimination indicating completion of the acclimatizing step, the acclimatizing step inducing natural genetic selections for a sufficiently long period of time from progressive acclimatization with successive generations of the mixture to the milk industry effluent;

b) inoculating said effluent with said acclimatized inoculum;

c) aerating the inoculated effluent while maintaining its temperature between 0° C. and 50° C.;

d) inducing cyclical increases and decreases of the dissolved oxygen content in the inoculated effluent at a maximum rate of 130 micromoles of oxygen per minute;

e) inducing cyclical increases and decreases of the pH of the inoculate effluent within the pH range between 1.7 and 9;

f) continuing steps d) and e) until obtention of a suspended biomass generated by the assimilation by the mixture of bacteria and yeasts of milk products contained in said effluent; and g) separating said biomass from residual interstitial water;

wherein growth and equilibrium coexistence of bacteria and yeast species within the effluent are achieved, and wherein flocculation of the biomass is promoted.

2. A process as defined in claim 1,
wherein in step e), the cyclical increases and decreases in pH are at a maximum rate of 1.5 pH units per minute.

3. A process as defined in claim 1,
further including the following step:
h) recycling part of the separated biomass of step g) back into said inoculated effluent.

4. A process as defined in claim 1, wherein said bacteria are selected from the group consisting of the following bacteria species:
acetobacters, bifidobacteria, lactobacillus, leuconostocs, pseudomonas, propionibacterium and lactic streptococci,
and said yeasts are selected from the group consisting of the following yeast species:
Candida, Debaryomyces, Dekkera, nipomyces, Pichia, Rhodotorula, Trichosporon, Saccharomyces.

5. A process as defined in claim 4, wherein said are selected from the group consisting of the following yeast strains:
*Candida aaseri, Candida auringiensis, Candida bertae, Candida blankii, Candida coipomensis, Candida curvata, Candida entomaea, Candida entomophila, Candida edax, Candida famata, Candida fennica, Candida fluviatilcis, Candida halophila, Candida hellenica, Candida intermedia, Candida mannitofaciens, Candida paludigena, Candida pseudots opicalis, Candida saitoana, Candida sake, Candida salmnanticensis, Candida sheatae, Candida valdiviana, Candida versatil is, Debaryomyces castelihi, Debaryomnyces marama, Debaryomyces occidentalis, Debaryomyces polymorphus, Debaryomyces pseudopolymorphus, Debaryomyces tamarli, Debaryomyces yamadae, Dekkera anomala, Lipomyces starkeyi, Lipomyces tetrasporus, Pichia abadieae, Pichia acaciae, Pichia farinosa, Pichia membranefaciens, Pichia mexicana, Pichia scolyti, Pichia sorbitophila, Pichia stipitis, Rhodotorula acuta, Rhodotorula dulciaminis, Rhodotorula minuta, Trichosporon aquatile, Trichosporon beigelii, Trichosporon loubieri.*

6. A process as defined in claim 5, wherein the yeast strain *Saccharomyces cerevisiae* is added to said inoculum.

7. A process as defined in claim 4, wherein said mixture is allowed to grow as a free culture in said effluent.

8. A process as defined in claim 4,
wherein step a) includes aerating and stirring the inoculated sample while preventing its temperature from exceeding 50° C.

9. A process as defined in claim 4,
wherein step a) includes aerating the inoculated sample within a vessel having an oxygen permeable membrane and maintaining the inoculated sample at a maximum temperature of 4° C.

10. A process as defined in claim 4, wherein, when in step c), the liquor temperature is maintained between 20° C. and 50° C., said bacteria are selected from the group consisting of the following bacteria strains:
*Lactobacillus acidophilus, Lactobacillus delbruecki bulgaricus, Lactobacillus delbruecki delbruecki, Lactobacillus delbruecki lactis, Lactobacillus farciminis, Lactobacillus fermentum, Lactobacillus helveticus* and *Streptococcus thermophilus.*

11. A process as defined in claim 4, wherein, when in step c), the liquor temperature is maintained between 0° C. and 20° C., said bacteria selected from the group consisting of the following bacteria strains:
*Lactobacillus brevis, Lactobacillus casei casei, Lactobacillus kefir, Lactobacillus plantarum, Leuconostoc dextranicum, Leuconostoc lactis, Leuconostoc mesenteroides cremoris, Leuconostoc mesenteroides mesentoroides, Streptococcus lactis cremoris* and *Streptococcus lactis lactis.*

12. A process as defined in claim 4, wherein said inoculum further includes at least one bacteria strain selected from the group consisting of the following bacteria strains:
*Acetobacter aceti, Propionibacterium freundenreichii shermanii, Pseudomonas fragi,* and *Streptococcus lactis diacetylactis.*

13. A process as defined in claim 4, wherein said inoculum further includes at least one bacteria strain selected from the group consisting of the following bacteria strains:
*Bifidobacterium bifidum, Bifidobacterium breve* and *Bifidobacterium infantis.*

14. A process as defined in claim 4, wherein step c) further includes the addition to the inoculated effluent of a nutrient selected from the group consisting of ammonium hydroxide, salts of ammonium, amines, amides, urea and amino-acids.

15. A process as defined in claim 4,
further including the following step:
h) recycling part of the separated biomass of step g) back into said inocluated effluent; and
i) hydrolyzing at least part of the inoculated effluent into amino acids to constitute a nutrient.

16. A process as defined in claim 15, wherein hydrolysis is effected by an acid or enzymes in a quantity such that partial or complete hydrolysis is completed within one to twelve hours.

17. Apparatus for pretreating a milk industry effluent comprising a reactor vessel for reacting a liquor containing said effluent, aerating means for aerating said liquor, first aerating varying means to induce said aerating means into cyclical increases and decreases of the dissolved oxygen content in the effluent, first programming means controlling said first varying means including liquor dissolved oxygen detecting and measuring means coupled to said first programming means, an acid metering pump connected to said reactor vessel, second programming means controlling said pump to vary acid injection into said vessel to induce cyclical increases and decreases of the pH in the effluent;

liquor detecting and measuring means coupled to said second programming means and phase separating means connected to the outlet of said reactor vessel;

further including a hydrolysing apparatus connected to the inlet of said reactor vessel and means to feed chemicals to said hydrolysing apparatus;

wherein growth and equilibrium coexistence of the bacteria and yeast species within the dairy effluent are achieved, and wherein flocculation of the biomass is promoted.

18. Apparatus as defined in claim 17, further including heat exchanger means within said reactor vessel for cooling the liquor being treated or for heat recovery.

19. In combination, a supply of milk industry effluent and an apparatus for the continuous production of edible biomass for animal feed from said milk industry effluent, said effluent including an ose constituent; said apparatus comprising:

a bio-reactor vessel;

an acclimatized mixture of aerobic bacteria and yeasts, loaded with said effluent to form a liquor to be reacted inside said reactor vessel, wherein the acclimatized mixture has been acclimatized so as to induce natural genetic selections for a sufficiently long period of time from progressive acclimatization with successive generatins of the mixture of bacteria and yeasts to the effluent;

aerating means, for aerating said liquor;

first aerating varying means, to induce said aerating means into cyclical increases and decreases of the dissolved oxygen content in the liquor, wherein both said bacteria and yeasts are of a type interacting with the effluent so that an exothermic reaction occurs;

first programming means, controlling said first varying means and including liquor dissolved oxygen detecting and measuring means coupled to said first programming means, wherein the dissolved oxygen content of said liquor varies at a maximum rate of 130 micromoles of Oxygen per minute;

an acid metering pump, connected to said reactor vessel;

second programming means, controlling said pump to vary acid injection into said vessel, to induce cyclical increases and decrease of the rH in the effluent, wherein the pH range is maintained between 1.7 and 9, and the pH variability can attain a maximum of 1.5 units per minute;

liquor detecting and measuring means, coupled to said second programming means;

a hydrolysing apparatus connected to the inlet of said reactor vessel; and phase separating means, connected to the outlet of said reactor vessel for separating the solid biomass phase from the liquid phase of said liquor, and including means for partially recycling this separated solid biomass into said reactor vessel and for partially loading said solid biomass into said hydrolysing apparatus;

wherein the edible biomass is generated downstream of said hydrolysing apparatus;

wherein growth and equilibrium coexistence of the bacteria and yeast species within the dairy effluent are achieved, and wherein flocculation of the biomass is promoted.

* * * * *